United States Patent
Pesonen et al.

(10) Patent No.: US 12,478,040 B2
(45) Date of Patent: Nov. 25, 2025

(54) METHOD AND SYSTEM FOR CONTROLLING DAILY FEED OF ANIMALS

(71) Applicant: QUANTURI OY, Espoo (FI)

(72) Inventors: Nadine Pesonen, Siuntio (FI); Teppo Veijonen, Helsinki (FI)

(73) Assignee: QUANTURI OY, Espoo (FI)

( * ) Notice: Subject to any disclaimer, the term of this patent is extended or adjusted under 35 U.S.C. 154(b) by 343 days.

(21) Appl. No.: 17/767,768

(22) PCT Filed: Oct. 6, 2020

(86) PCT No.: PCT/EP2020/077948
§ 371 (c)(1),
(2) Date: Apr. 8, 2022

(87) PCT Pub. No.: WO2021/069413
PCT Pub. Date: Apr. 15, 2021

(65) Prior Publication Data
US 2024/0081279 A1    Mar. 14, 2024

(30) Foreign Application Priority Data

Oct. 11, 2019 (EP) ..................................... 19202653

(51) Int. Cl.
*A01K 5/02* (2006.01)
(52) U.S. Cl.
CPC .................................. *A01K 5/0275* (2013.01)
(58) Field of Classification Search
CPC .................................. A01K 5/0275; A01K 5/02
See application file for complete search history.

(56) References Cited

U.S. PATENT DOCUMENTS

| | | | |
|---|---|---|---|
| 6,651,585 B2 | 11/2003 | van den Berg | |
| 2010/0148959 A1* | 6/2010 | Jonsson | H04L 67/12 340/540 |
| 2011/0192213 A1* | 8/2011 | Zimmerman | A01K 5/02 73/23.3 |
| 2018/0177151 A1 | 6/2018 | Van Houten et al. | |
| 2021/0360900 A1* | 11/2021 | Karwacki | A01K 5/0266 |

FOREIGN PATENT DOCUMENTS

| | | | |
|---|---|---|---|
| CN | 104585539 A * | 5/2015 | ............... A23K 1/14 |
| EP | 2489258 | 8/2012 | |
| WO | 2019/035756 | 2/2019 | |

OTHER PUBLICATIONS

International Search Report and Written Opinion of the ISA for PCT/EP2020/077948, mailed Dec. 8, 2020, 12 pages.
Extended European Search Report fo EP Application No. 19202653.2 mailed Apr. 8, 2020, 7 pages.

* cited by examiner

*Primary Examiner* — Catherine T. Rastovski
*Assistant Examiner* — Lal Ce Mang
(74) *Attorney, Agent, or Firm* — Nixon & Vanderhye PC

(57) ABSTRACT

A method and a system for controlling daily feed of animals is disclosed. The method includes: measuring (302) repeatedly over a time period, by a plurality of stand-alone probes inserted inside stored forage, a temperature of the stored forage; determining (314) a quality of the stored forage based on the repeatedly measured temperature of the stored forage over the time period; and after determining (314) the quality of the stored forage, adjusting (320) a diet of an animal based on the determined quality of the stored forage, the adjusting (320) of the diet defining an additional amount of a supplementary feed.

11 Claims, 3 Drawing Sheets

METHOD AND SYSTEM FOR CONTROLLING DAILY FEED OF ANIMALS

Figure 1:
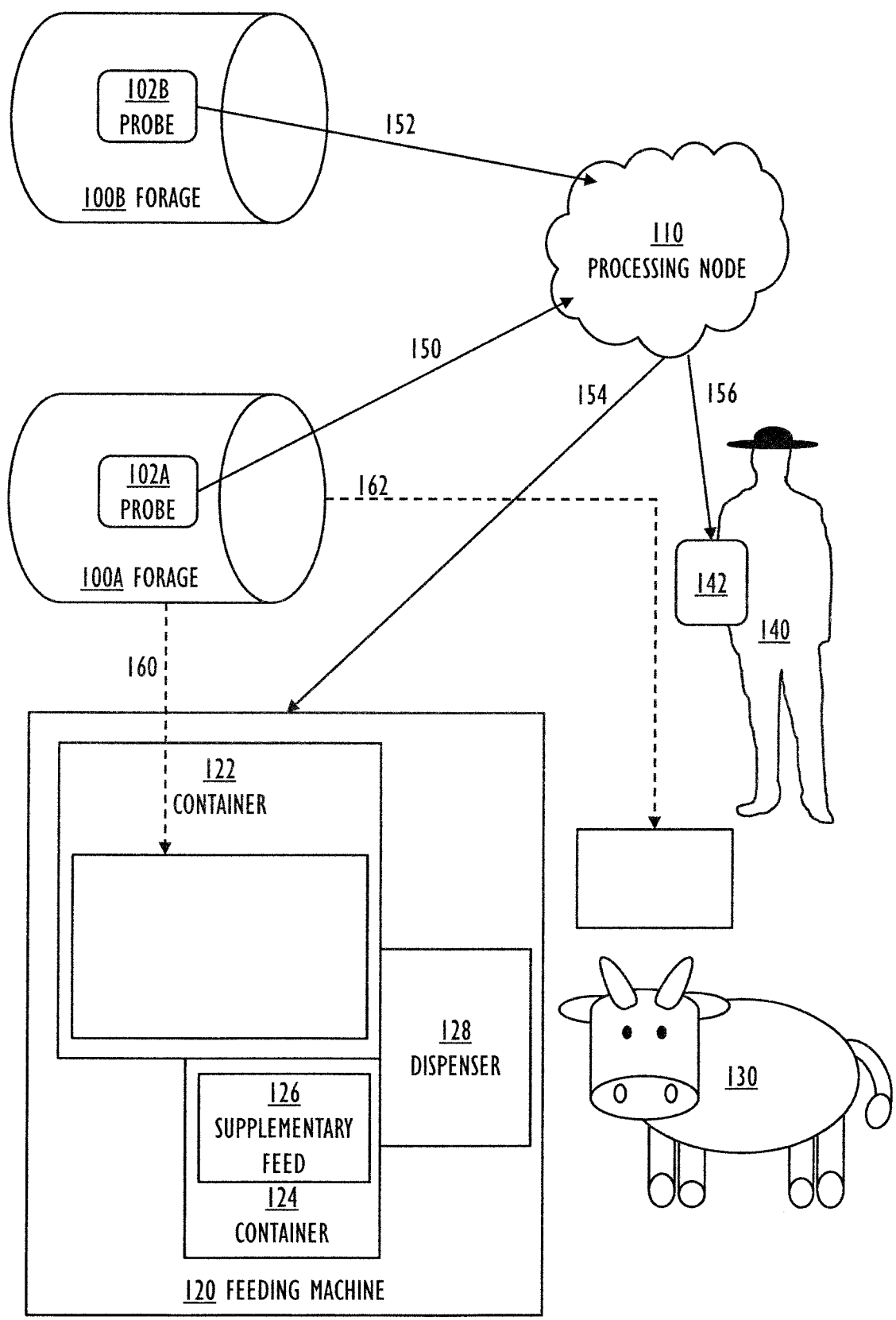

This application is the U.S. national phase of International Application No. PCT/EP2020/077948 filed Oct. 6, 2020 which designated the U.S. and claims priority to EP Patent Application No. 19202653.2 filed Oct. 11, 2019, the entire contents of each of which are hereby incorporated by reference.

FIELD

Various embodiments relate to a method and a system for controlling daily feed of animals.

BACKGROUND

Traditionally, laboratory analysis of forage is conducted from samples of the forage to obtain the composition of the forage. In developed countries, it is common practice to undertake most of the analyses in accredited laboratories. Laboratory analyses involve either wet chemistry to quantify protein, fibre, fat, and minerals or infrared reflectance spectroscopy (NIR) to measure nutrient content. It usually takes three weeks to one month for the chemical method and one week for the infra-red method (for dry matter in the laboratory) or immediate in raw material (infra-red portable analyser). The laboratory analysis reports the composition of forage, which then defines its quality. Veterinarians, farmers or nutritionist specialists devise specific rations based on the result of this analysis and on the needs of the animals. Poor forage (low CP, and low TDN) requires adding more supplementary nutrients (by-products, grain). Furthermore, rations are revaluated and adjusted later after conducting visual inspection of the wellbeing of animals, which translates into possible loss of weight, loss of appetite, and, for dairy animals, a decrease in milk production. In dairy farms, it is also common practice to conduct milk analysis to extract parameters such as milk proteins, milk fat, and kilos of milk produced. These parameters are a direct consequence of the given diet. The milk analysis allows adjusting the animal diet to balance milk quality and production.

Storage of the forage is crucial as its properties can degrade dramatically with the storage conditions. The higher the level of DM, the better the storage and the lower the risk of loss of quality. In case of low DM, a high content of moisture can activate a fermentation process, which will foster mould and dust inside forage. As a result, the content of for example CP, NDF, NFC, ADF, and TDN will change completely compared to the initial values at the beginning of storage. In the current diet establishment procedures, only the value of the forage at the beginning of the storage or at some later stage (but not immediately before consumption) is considered and not the value of forage at the time of feeding. The forage quality may have changed greatly during storage. Nevertheless, these changes are not considered in the feed adjustment. Changes are considered only after visual inspection or milk analysis, which brings latency in results. Consequently, these changes in forage quality during storage may have a major influence on the wellbeing of the animals.

BRIEF DESCRIPTION

According to an aspect, there is provided subject matter of independent claims. Dependent claims define some embodiments.

One or more examples of implementations are set forth in more detail in the accompanying drawings and the description of embodiments.

LIST OF DRAWINGS

Figure 2:
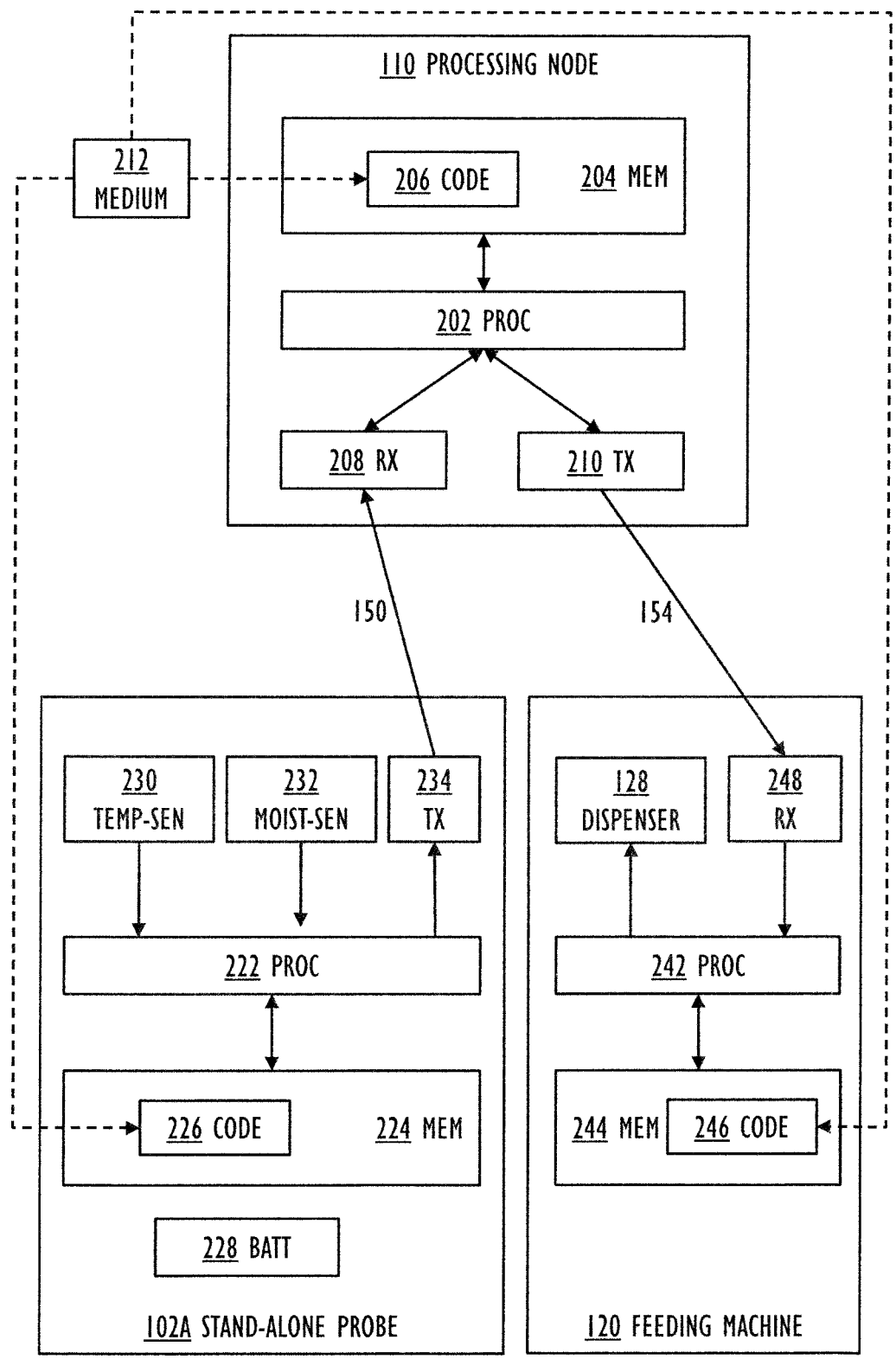
Figure 3:
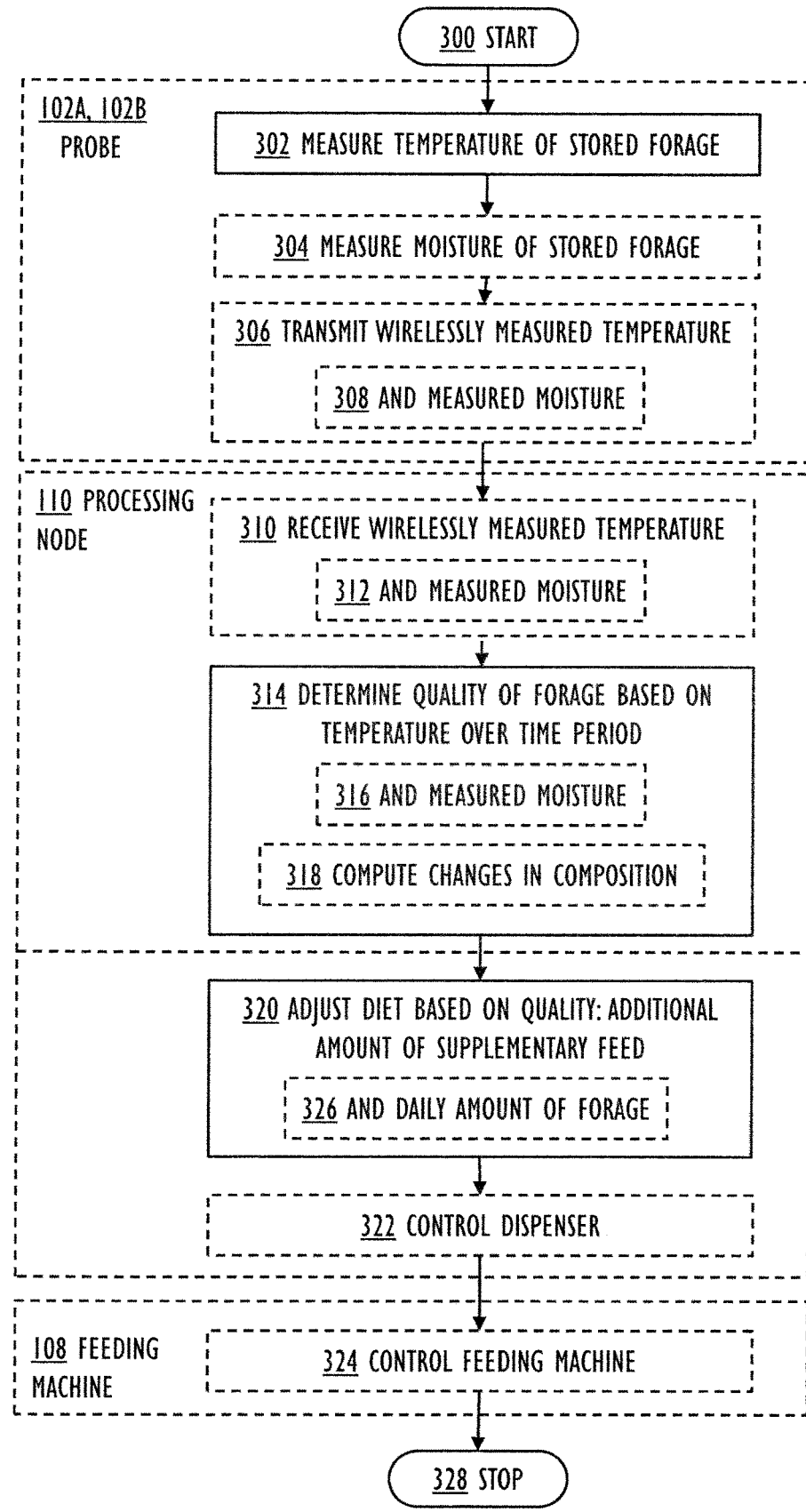

Some embodiments will now be described with reference to the accompanying drawings, in which FIG. 1 and FIG. 2 illustrate embodiments of a system for controlling daily feed of animals; and FIG. 3 is a flow chart illustrating embodiments of a method for controlling daily feed of animals.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Reference numbers, both in the description of the embodiments and in the claims, serve to illustrate the embodiments with reference to the drawings, without limiting it to these examples only.

The embodiments and features, if any, disclosed in the following description that do not fall under the scope of the independent claims are to be interpreted as examples useful for understanding various embodiments of the invention.

Let us study simultaneously FIG. 1 and FIG. 2, which illustrate embodiments of a system for controlling daily feed of animal, and FIG. 3 illustrating embodiments of a method for controlling daily feed of animals.

Forage 100A, 100B is a critical diet compound of all grazing domesticated livestock 130 such as cattle, horses, goats, and sheep as it constitutes a complementary element or even a full substitute to the required animal feed. Forage 100A, 100B is fed to the livestock 130 to increase quality of the fodder or to replace fully grazing on grasses in a pasture when cattle 130 is permanently kept in stables or during times when drought or other conditions make pastures unavailable. The forage 100A, 100B may be a mixture of grass (ryegrass, timothy, brome, fescue, Bermuda grass, and orchard grass), legumes (alfalfa or Lucerne) and clovers (red, white and subterranean) and other herbaceous plants that might be region specific.

The forage 100A, 100B is composed of dry matter (DM) and moisture. The dry matter corresponds to the feed without moisture and is the nutritional contribution to the animal diet. The dry matter is further decomposed into minerals, crude proteins (CP), carbohydrates, and fat. Minerals enable structural and physiological functions. Calcium (Ca), Phosphorus (P), Sodium (Na), Chloride (Cl), Magnesium (Mg), Potassium (K), Sulphur (S), Cobalt (Co), Copper (Cu), Fluoride (F), Iron (Fe), Manganese (Mn), Molybdenum (Mo), Selenium (Se) and Zinc (Zn) are typically found in the forage 100A, 100B. Crude Proteins (CP) are essential for reproduction, lactation, growth, and maintenance of the body of the animals 130. The content of CP in the forage 100A, 100B is an indicator of the quality of the forage 100A, 100B. Carbohydrates are energy sources for the animals 130 and are divided into structural (cell wall components) and non-structural (cell contents) elements. Fat is essential for production of hormones. Non-structural carbohydrates are subsidized into non fibre carbohydrates (NFC) that include starch and sugars inside the cell (energy sources for the animal 130), water-soluble carbohydrates (WSC) (sugars that are soluble in water such as fructan) and ether-soluble carbohydrates (ESC) (sugars soluble in ether). Structural carbohydrates are composed of pectin and neutral detergent fibres (NDF). NDF is the single best indicator of intake. NDF gives a plant structure and rigidity and is composed of cellulose and hemicellulose (also known as acid detergent fibres (ADF)) that may be partially broken down by microbes in the rumen to provide energy to the animal 130, and of acid detergent lignin (ADL) that is indigestible. NDF is negatively correlated with feed intake: the higher the NDF % of the forage 100A, 100B, the lower the intake. ADF is the best indicator of forage digestion. ADF is negatively correlated with digestibility: the higher the ADF % of the forage 100A, 100B, the lower the digestibility.

Livestock 130 requires a specific diet, also called ration that must contain a specific quantity of intake and concentration of different nutrients to maintain their caloric demands. For dairies, proper nutrition results in greater production and improved efficiency (pounds of milk or weight gained per pound of feed consumed). Caloric demands depend on the stage or the use of the animals 130 (growing, lactating, dry, draft horses, competition horses, etc.). Most of the caloric demand is found from the composition of the forage 100A, 100B. Feed has a fundamental influence on productivity, health and welfare of the animal 130. Feed quality influences animal product quality and safety, and the environment. To achieve balance among these parameters, the animal's 130 nutritional requirements must be properly assessed. Supplementary nutrients 126 are added to compensate for possible lack of nutritive elements in the forage 100A, 100B. Composition of the forage 100A, 100B is therefore vital to the wellbeing of farming animals 130.

The system for controlling daily feed of animals 130 comprises a plurality of stand-alone probes 102A, 102B insertable inside the stored forage 100A, 100B, and a processing node 110 communicatively coupled with stand-alone probes 102A, 102B.

The system monitors in real-time and continuously the quality of the stored forage 100A, 100B and dynamically and automatically adjusts the daily feed of animals 130.

Each stand-alone probe 102A, 102B comprises a temperature sensor 230, a wireless transmitter 234, a battery 228, one or more processors 222, and one or more memories 224 including computer program code 226. The one or more memories 224 and the computer program code 226 are configured to, with the one or more processors 222, cause the stand-alone probe 102A, 102B at least to perform:
measuring 302 repeatedly over a time period, by the temperature sensor 230, a temperature of the stored forage 100A, 100B; and
transmitting 306 wirelessly 150, 152, by the wireless transmitter 234, the repeatedly measured temperature of the stored forage 100A, 100B, to a processing node 110.

In an embodiment, the battery 228 may be an electric battery converting stored chemical energy into electrical energy. The electric battery 228 may be rechargeable. In an embodiment, the stand-alone probe 102A, 102B may comprise a power interface to receive electrical energy for charging the battery 228. The power interface may couple the stand-alone apparatus 102A, 102B to mains electricity, to a charger connector in a vehicle, or to some other power source enabling the charging of the battery 228. In addition to, or instead of, the battery 228, the stand-alone probe 102A, 102B may comprise another portable energy source such as a solar cell converting the energy of light directly into electricity by the photovoltaic effect, or a a fuel cell converting the chemical energy from a fuel into electricity through a chemical reaction with oxygen or another oxidizing agent.

The stand-alone probe 102A, 102B is to be inserted inside forage 100A, 100B at the time of collection (harvest) or beginning of storage. The time period (during which the temperature is repeatedly measured) lasts from a beginning of storage of the forage 100A, 100B to a feeding of the forage 100A, 100B to the animal 130. FIG. 1 illustrates an embodiment, wherein the stand-alone probes 102A, 102B are inside the forage 100A, 100B, which may be subjected to the weather but also to changing conditions in a barn or other storage. The stand-alone probe 102A is removed from the forage 100A before the forage 100A is distributed 162 to the animals 130, or loaded 160 into a container 122 of the feeding machine 120. In this way, the true quality of the stored forage 100A, 100B may be obtained immediately prior to the consumption of the forage 100A, 100B by the animals 130.

The stand-alone probe 102A, 102B reads outs parameters from sensors 230, 232, possibly storing the parameters in the memory 224, and possibly performing calculations with the processor 222 based on the measured parameters. The stand-alone probe sends 150, 152 its data wirelessly to the processing node 110, where further data processing may be done. The sending 150, 152 of the data may be performed continuously, periodically, in batches, or according to another scheme, which enables transmission of the results of the repeated temperature measurements from the stand-alone probe 102A, 102B to the processing node 110.

The stand-alone probe 100A, 100B is encapsulated by an enclosure. The enclosure may be made of synthetic plastics. The synthetic plastics include but are not restricted to Acrylonitrile butadiene styrene (ABS), Polyethylene terephthalate (PET), Polyurethane, Polycarbonate, Polyimide (PI), which are not prone to oxidation when in contact with damp material. The enclosure is hermetic and waterproof. The enclosure may be of any shape. The enclosure may be made of fluorescent or well visible material for recognition from among the forage 100A, 100B before feeding or loading to the feeding machine 120.

In an embodiment, the stand-alone probe 102A, 102B may operate in a power saving mode to de-activate the sensors 230, 232 after a measuring period, and to deactivate the transmitter 234 after the transmission.

In an example embodiment, each stand-alone probe 102A, 102B is assigned a unique identifier, which may also be used in communication 150, 152 with the processing node 110.

The processing node 110 comprises a wireless receiver 208, one or more processors 202, and one or more memories 204 including computer program code 206. The one or more memories 204 and the computer program code 206 are configured to, with the one or more processors 202, cause the processing node 110 at least to perform:
receiving 310 wirelessly, by the wireless receiver 208, the repeatedly measured temperature of the stored forage 100A, 100B from the plurality of the stand-alone probes 102A, 102B;

determining a quality of the stored forage 100A, 100B based on the repeatedly measured temperature of the stored forage 100A, 100B over the time period; and after determining 314 the quality of the stored forage 100A, 100B, adjusting 320 a diet of an animal 130 based on the determined quality of the stored forage 100B, the adjusting 320 of the diet defining an additional amount of a supplementary feed 126.

In an embodiment, determining the quality of the stored forage is determined 314 based on the repeatedly measured temperature of the stored forage over the time period so that changes in a composition of the stored forage are computed 318 based on a number of heating degree days. The number of the heating degree days is a measure of the number of days for which the temperature of the stored forage 100A, 100B has been over a predefined threshold. The changes in the composition of the stored forage 100A, 100B may constitute the inputs for controlling the feeding machine 120: the animal feed is automatically adjusted 320 based on the changes of the forage quality. The wellbeing of the animals 130 is maintained independently of the quality of the forage. There is no latency or only a short latency (such as a few hours or 24 hours at most) in the feed adjustment.

In an embodiment, the quality of the stored forage 100A, 100B may refer to a change of the quality of the stored forage 100A, 100B during the time period (as compared to an initial quality at the beginning of the time period, for example). The change of the quality may be indicated as changes of parameters, for example CP, NDF, NFC, ADF, and TDN, as compared to the initial values at the beginning of the time period. The initial values may either be indicated by a cattleman 140 (with a user interface of a user apparatus 142, for example) or computed by the system (by the processing node 110, for example) based on big data analysis. The cattleman 140 may obtain the initial values from a laboratory testing of the stored forage 100A, 100B (the samples taken during the harvest or at the beginning of the storage), for example. The big data analysis may indicate typical values for a certain plant in a certain geographical area, possibly also taking into account weather conditions during the growing season of the forage 100A, 100B.

Data processing in the processing node 110 includes computing the changes in forage quality, translating changes in, but not limited to, CP, NDF, ADF and TDN as a function of time. Naturally, besides these characteristics of the stored forage 100A, 100B, also one or more of the other earlier-mentioned characteristics of the stored forage 100A, 100B may be estimated based on the temperature profile of the time period. The animal diet may be established by a decision logic that returns the right diet based on the true value of the stored forage 100A, 100B and requirements of the animal 130. Thus, the composition of the stored forage 100A, 100B may be evaluated, and the daily ration of feed to the animals 130 may actively be controlled so that adequate energy level and vital nutrients are guaranteed. The diet of the animal 130 is adjusted 320 as regards to the additional amount of the supplementary feed 126, whereby changes in the quality of the stored forage 100A, 100B are compensated. In an embodiment, the diet of the animal 130 may be adjusted 320 as regards to both the daily amount of the stored forage 100B and the additional amount of the supplementary feed 126; this may be necessary if the adjustment of the amount of the supplementary feed 126 alone does not result in an optimal diet 130, for example. The stored forage 110A may be distributed first for the animals 130 to eat. Later, on the same day (when being milked or after that, for example), the animals 130 are fed the supplementary feed 126. The animals 130 may go to the automatic feeding machine 120 to get their supplementary feed 126.

In an embodiment, the adjusted diet of the animal 130 may be transmitted 156 to a user apparatus 142 of a cattleman 140. The cattleman 140 may take care of feeding the daily amount of the stored forage 100B and the additional amount of the supplementary feed 126 to the animal 130. As shown in FIG. 1, the stored forage 100A may be distributed 162 to the animals by the cattleman 140.

In an embodiment, the user apparatus 142 may be a communication apparatus of the end user 142. A non-exhaustive list of the types of the user apparatus 142 includes, but is not limited to: a smartwatch, a mobile phone, a smartphone, a tablet computer, a phablet, a general-purpose mobile computing device, a computer, a laptop. In an embodiment, the user apparatus 142 is a general-purpose off-the-shelf computing device, as opposed to a purpose-build proprietary equipment, whereby research & development costs will be lower as only the special-purpose software (and not the hardware) needs to be designed, implemented and tested. The user apparatus 142 may employ a suitable operating system such as iOS, Android, or Windows, for example. In an embodiment, the user apparatus 142 runs a specific software application, which enables interaction with the processing node 110. In an embodiment, the processing apparatus 110 implements a user web service providing service to the user 140 (by receiving information from the processing node 110, and providing information to the user 140, for example).

In an embodiment, a feeding machine 128 may be used to dispense at least the additional amount of the supplementary feed 126, but possibly also the daily amount of the stored forage 100A, 100B. The feeding machine 120 may comprise a wireless receiver 248, one or more processors 242, and one or more memories 244 including computer program code 246. The one or more memories 244 and the computer program code 246 are configured to, with the one or more processors 204, cause the performance of the feeding machine 120. Alternatively, the processing node 110 and the feeding machine 120 may be communicatively coupled 154 by a wired connection such as Ethernet or a standard or proprietary communication bus, and thereby the controlling 322 is performed in a wired fashion. Note that even such a scenario is feasible, wherein two feeding machines 120 are used: one for the feeding of the stored forage 100A, and the other for the feeding of the supplementary feed 126.

In an embodiment, the processing node 110 also comprises a wireless transceiver 210.

In an embodiment, the method and system for controlling the daily feed of the animals 130 is a method and system for controlling a feeding machine 120.

In an embodiment, the processing node 110 is caused to perform:

controlling 322 wirelessly, by the wireless transceiver 210, a dispenser 128 of a feeding machine 120 so that the additional amount of the supplementary feed 126 is dispensed from one or more supplementary nutrient containers 124 of the feeding machine 120.

In an embodiment, the processing node 110 is caused to perform:

controlling 322 wirelessly, by the wireless transceiver 210, the dispenser 128 of the feeding machine 120 so that the daily amount of the stored forage 100B is dispensed from a forage container 122 of the feeding machine 120.

The term 'processor' 202, 222, 242 refers to a device that is capable of processing data. Depending on the processing power needed, each apparatus 102A, 102B 110, 120 may comprise several processors 202, 222, 242 such as parallel processors, a multicore processor, or a computing environment that simultaneously utilizes resources from several physical computer units (sometimes these are referred as cloud, fog or virtualized computing environments). When designing the implementation of the processor 202, 222, 242, the person skilled in the art will consider the requirements set for the size and power consumption of the apparatus, the necessary processing capacity, production costs, and production volumes, for example.

The term 'memory' 204, 224, 244 refers to a device that is capable of storing data run-time (=working memory) or permanently (=non-volatile memory). The working memory and the non-volatile memory may be implemented by a random-access memory (RAM), dynamic RAM (DRAM), static RAM (SRAM), a flash memory, a solid state disk (SSD), PROM (programmable read-only memory), a suitable semiconductor, or any other means of implementing an electrical computer memory.

A non-exhaustive list of implementation techniques for the processor 202, 222, 242 and the memory 204, 224, 244 includes, but is not limited to: logic components, standard integrated circuits, application-specific integrated circuits (ASIC), system-on-a-chip (SoC), application-specific standard products (ASSP), microprocessors, microcontrollers, digital signal processors, special-purpose computer chips, field-programmable gate arrays (FPGA), and other suitable electronics structures.

The computer program code 206, 226, 246 may be implemented by software. In an embodiment, the software may be written by a suitable programming language, and the resulting executable code may be stored in the memory 204, 224, 244 and executed by the processor 202, 222, 242.

An embodiment provides a computer-readable medium 212 storing the computer program code 206, 226, 246, which, when loaded into the one or more processors 202, 222, 242 and executed by one or more processors 202, 222, 242, causes the one or more processors 202, 222, 242 to perform the algorithm/method, which will be explained with reference to FIG. 3.

The operations are not strictly in chronological order in FIG. 3, and some of the operations may be performed simultaneously or in an order differing from the given ones. Other functions may also be executed between the operations or within the operations and other data exchanged between the operations. Some of the operations or part of the operations may also be left out or replaced by a corresponding operation or part of the operation. It should be noted that no special order of operations is required, except where necessary due to the logical requirements for the processing order.

The method starts in 300 and ends in 328. Note that the method may run as long as required by looping from operation 320 or 322 or 324 back to operation 302.

The computer-readable medium 212 may comprise at least the following: any entity or device capable of carrying the computer program code 206, 226, 246 to the one or more processors 202, 222, 242, a record medium, a computer memory, a read-only memory, an electrical carrier signal, a telecommunications signal, and a software distribution medium. In some jurisdictions, depending on the legislation and the patent practice, the computer-readable medium 212 may not be the telecommunications signal. In an embodiment, the computer-readable medium 212 may be a computer-readable storage medium. In an embodiment, the computer-readable medium 212 may be a non-transitory computer-readable storage medium.

The computer program code 206, 226, 246 implements the method as an algorithm measuring 302 repeatedly the temperature of the stored forage 100A, 100B, determining 314 the quality of the stored forage 100A, 100B, adjusting 320 the diet of the animal 130 based on the determined quality of the stored forage 100A, 100B, and controlling 322 a dispenser of the feeding machine 120. As shown in the drawings, the algorithm may be distributed among various actors 102A, 110, 120, whereby communication 150, 154 between the actors 102A, 110, 120 synchronizes the operation of the algorithm.

The computer program code 206, 226, 246 may be coded as a computer program (or software) using a programming language, which may be a high-level programming language, such as C, C++, or Java, or a low-level programming language, such as a machine language, or an assembler, for example. The computer program code 206, 226, 246 may be in source code form, object code form, executable file, or in some intermediate form. There are many ways to structure the computer program code 206, 226, 246: the operations may be divided into modules, sub-routines, methods, classes, objects, applets, macros, etc., depending on the software design methodology and the programming language used. In modern programming environments, there are software libraries, i.e. compilations of ready-made functions, which may be utilized by the computer program code 206, 226, 246 for performing a wide variety of standard operations. In addition, an operating system (such as a general-purpose operating system) may provide the computer program code 206, 226, 246 with system services.

In an embodiment, the one or more processors 202, 222, 242 may be implemented as one or more microprocessors implementing functions of a central processing unit (CPU) on an integrated circuit. The CPU is a logic machine executing the computer program code 206, 226, 246. The CPU may comprise a set of registers, an arithmetic logic unit (ALU), and a control unit (CU). The control unit is controlled by a sequence of the computer program code 206, 226, 246 transferred to the CPU from the (working) memory 204, 224, 244. The control unit may contain a number of microinstructions for basic operations. The implementation of the microinstructions may vary, depending on the CPU design.

In an embodiment, the stand-alone probe 102A implements the processor 222, memory 224, and the program code 226 as a microcontroller, which is an embedded computer on a single integrated circuit containing a processor core, memory, and programmable input/output peripherals (to control the sensors 230, 232, and the radio transmitter 234). In an embodiment, such microcontroller may also include a built-in radio transmitter 234. These electronics of the stand-alone probe 102A may also be implemented as an ASIC.

In an embodiment, the processing node 110 may comprise an external reader, a base station or more generally a network node to which the stand-alone probes 102A, 102B transmit the monitored data.

The data analysis conducted on the monitored parameters may either be made at the stand-alone probe 102A, 102B level (at least to some degree) or at the processing node 110 level.

The processing node 110 may also be distributed in the sense that the external reader relays the information to a proprietary server or a computing cloud for further processing.

Determining 314 the quality of the stored forage 100A, 100B, and the adjusting 320 of the diet of the animal 130 based on the determined quality of the stored forage 100A, 100B may be performed in a distributed fashion: by two separate data processing components of the distributed processing node 110.

In an embodiment, the processing node 110 may be implemented by a suitable computing resource or a combination of various computing resources. In an embodiment, the processing node 110 may be implemented as a single server computer or as a cluster of computers. The server is a part of the client-server computing model that acts as distributed application which partitions tasks or workloads between the provider of a resource or service, called server, and the service requester, called client. The server 110 may serve a large number of stand-alone probes 102A, 102B. In an embodiment, the server apparatus 110 may also operate according to the cloud computing model or another suitable distributed computing architecture, at least in part.

Picture the following scenario, for example: the stand-alone probes 102A, 102B are inside the forage 100A, 100B in a barn, and the processing node 110 is in an office of the farmer 140, or the processing node 110 may even be a part of the feeding machine 120 or closely coupled to it.

The radio transmitter 234 and the radio receiver 208 may utilize low frequencies of the ISM band (for example but not limited to 26.957 MHz 27.283 MHz or 433.050-434.790 MHz) for better radio-frequency penetration inside damp material. An antenna of the radio transmitter 234 may be designed for matching the radio transmitter 234 and for radiation in a possible damped environment.

Note that one or more of the radio transmitters 210, 234 and radio receivers 208, 248 may be implemented as radio transceivers.

In an embodiment, the radio transceiver is implemented as a cellular radio transceiver and/or a non-cellular radio transceiver. In an embodiment, the cellular radio transceiver may be interoperable with various wireless standard/non-standard/proprietary cellular radio networks such as any mobile phone network, which may be coupled with a wired network such as the Internet.

In an embodiment, the wireless communication network comprises any mobile phone network, regardless of the generation (such as 2G, 3G, 4G, beyond 4G, 5G etc.) such as GSM (Global System for Mobile Communications), GPRS (General Packet Radio Service), EGPRS (Enhanced GPRS), WCDMA (Wideband Code Division Multiple Access), UMTS (Universal Mobile Telephone System), 3GPP (The 3rd Generation Partnership Project), IMT (International Mobile Telecommunication), LTE (Long Term Evolution, LTE-A (LTE-Advanced), Mobile WiMAX, NBIoT, LoRa, SigFox, and other radio systems (in their present forms and/or in their evolution forms).

In an embodiment, the communication network supports the use of subscriber identity module (SIM), which may be an integrated circuit storing subscriber data, which is network-specific information used to authenticate and identify the subscriber on the cellular network. The subscriber identity module may be embedded into a removable SIM card. Consequently, one or more actors 102A, 110, 120 may include the SIM card (and a SIM card reader), or an embedded-SIM (eSIM).

In an embodiment, the stand-alone probe 102A, 102B also comprises a moisture sensor 232. The stand-alone probe 102A, 102B is caused to perform:
measuring 304 repeatedly over the time period, by the moisture sensor 232, a moisture of the stored forage 100A, 100B; and
transmitting 308 wirelessly, by the wireless transmitter 234, the repeatedly measured moisture of the stored forage 100A, 100B, to the processing node 110. The processing node 110 is caused to perform:
receiving 312 wirelessly, by the wireless receiver 208, the repeatedly measured moisture of the stored forage 100A, 100B from the plurality of the stand-alone probes 102A, 102B; and
determining 312 the quality of the stored forage 100A, 100B, based on both the repeatedly measured temperature of the stored forage 100A, 100B over the time period, and the repeatedly measured moisture 316 of the stored forage 100A, 100B over the time period. As explained earlier, the moisture changes, besides the temperature changes may have an effect on the quality of the stored forage 100A, 100B, and this effect may be estimated with the described embodiments. Naturally, the specific estimation may depend on the type of the forage 100A, 100B, but the skilled person will be able to adjust the required rules within his/her normal competence.

Even though the invention has been described with reference to one or more embodiments according to the accompanying drawings, the invention is not restricted thereto but can be modified in several ways within the scope of the appended claims. All words and expressions should be interpreted broadly, and they are intended to illustrate, not to restrict, the embodiments. It will be obvious to a person skilled in the art that, as technology advances, the inventive concept can be implemented in various ways.

The invention claimed is:

1. A method for controlling daily feed of animals, the method comprising:
measuring repeatedly over a time period, by a plurality of stand-alone probes inserted inside stored forage, a temperature of the stored forage, wherein the time period lasts from a beginning of storage of the forage to a feeding of the forage;
transmitting wirelessly, by the plurality of the stand-alone probes, the repeatedly measured temperature of the stored forage, to a processing node;
determining, by the processing node, a quality of the stored forage based on the repeatedly measured temperature of the stored forage over the time period so that changes in a composition of the stored forage are computed based on a number of heating degree days of the stored forage, the number of heating degree days being a measure of the number of days for which the temperature of the stored forage has been over a predefined threshold; and
after determining the quality of the stored forage and before starting the feeding, adjusting, by the processing node, a diet of an animal based on the determined quality of the stored forage, the adjusting of the diet defining an additional amount of a supplementary feed based on the number of heating degree days of the stored forage.

2. The method of claim 1, further comprising:
controlling a dispenser of a feeding machine so that the additional amount of the supplementary feed is dispensed from one or more supplementary nutrient containers of the feeding machine.

3. The method of claim 1, wherein the adjusting of the diet additionally defines a daily amount of the stored forage.

4. The method of claim 1, further comprising:
controlling wirelessly, by the processing node, a dispenser of a feeding machine so that the additional amount of the supplementary feed is dispensed from one or more supplementary nutrient containers of the feeding machine.

5. The method of claim 4, wherein the adjusting of the diet defines a daily amount of the stored forage, and the method further comprises:
controlling wirelessly, by the processing node, the dispenser of the feeding machine so that the daily amount of the stored forage is dispensed from a forage container of the feeding machine.

6. The method of claim 1, further comprising:
measuring repeatedly over the time period, by the plurality of stand-alone probes inserted inside the stored forage, a moisture of the stored forage; and
determining the quality of the stored forage, based on both the repeatedly measured temperature of the stored forage over the time period, and the repeatedly measured moisture of the stored forage over the time period.

7. The method of claim 6, further comprising:
transmitting wirelessly, by the plurality of probes, the repeatedly measured moisture of the stored forage, to a processing node; and
determining the quality of the stored forage by the processing node.

8. A system for controlling daily feed of animals, comprising:
a plurality of stand-alone probes insertable inside stored forage, each stand-alone probe comprising a temperature sensor, a wireless transmitter, a battery, one or more processors, and one or more memories including computer program code, the one or more memories and the computer program code being configured to, with the one or more processors, cause the stand-alone probe at least to perform operations comprising:
measuring repeatedly over a time period, by the temperature sensor, a temperature of the stored forage, wherein the time period lasts from a beginning of storage of the forage to a feeding of the forage; and
transmitting wirelessly, by the wireless transmitter, the repeatedly measured temperature of the stored forage, to a processing node, and
a processing node comprising a wireless receiver, one or more processors, and one or more memories including computer program code, the one or more memories and the computer program code being configured to, with the one or more processors, cause the processing node at least to perform:
receiving wirelessly, by the wireless receiver, the repeatedly measured temperature of the stored forage from the plurality of the stand-alone probes;
determining a quality of the stored forage based on the repeatedly measured temperature of the stored forage over the time period so that changes in a composition of the stored forage are computed based on a number of heating degree days of the stored forage, the number of heating degree days being a measure of the number of days for which the temperature of the stored forage has been over a predefined threshold; and
after determining the quality of the stored forage and before starting of the feeding, adjusting a diet of an animal based on the determined quality of the stored forage, the adjusting of the diet defining an additional amount of a supplementary feed based on the number of heating degree days of the stored forage.

9. The system of claim 8, wherein the processing node also comprises a wireless transceiver, and the processing node is caused to perform:
controlling wirelessly, by the wireless transceiver, a dispenser of a feeding machine so that the additional amount of the supplementary feed is dispensed from one or more supplementary nutrient containers of the feeding machine.

10. The system of claim 8, wherein the adjusting of the diet additionally defines a daily amount of the stored forage.

11. The system of claim 8, wherein the stand-alone probe also comprises a moisture sensor, and the stand-alone probe is caused to perform:
measuring repeatedly over the time period, by the moisture sensor, a moisture of the stored forage; and
transmitting wirelessly, by the wireless transmitter, the repeatedly measured moisture of the stored forage, to the processing node, and
wherein the processing node is caused to perform:
receiving wirelessly, by the wireless receiver, the repeatedly measured moisture of the stored forage from the plurality of the stand-alone probes; and
determining the quality of the stored forage, based on both the repeatedly measured temperature of the stored forage over the time period, and the repeatedly measured moisture of the stored forage over the time period.

* * * * *